United States Patent [19]
Gautier et al.

[11] Patent Number: 5,214,996
[45] Date of Patent: Jun. 1, 1993

[54] VACUUM BRAKE-BOOSTER OF THE TANDEM TYPE

[75] Inventors: Jean-Pierre Gautier, Aulnay Sous Bois; Miguel Perez, Argenteuil; Ulysse Verbo, Aulnay-Sous-Bois, all of France

[73] Assignee: Bendix Europe Services Techniques, Drancy, France

[21] Appl. No.: 764,588

[22] Filed: Sep. 24, 1991

[30] Foreign Application Priority Data

Oct. 10, 1990 [FR] France ................ 90 12484

[51] Int. Cl.$^5$ .............................................. F15B 9/10
[52] U.S. Cl. .................................. 91/376 R; 91/533; 92/48
[58] Field of Search .................. 92/48, 98 D, 99; 91/376 R, 369.1, 369.2, 369.3, 369.4, 533

[56] References Cited

U.S. PATENT DOCUMENTS

| | | | |
|---|---|---|---|
| 4,345,506 | 8/1982 | Ohomi | 91/376 R |
| 4,667,471 | 5/1987 | Fulmer et al. | 92/48 X |
| 4,862,787 | 9/1989 | Suzuki et al. | 91/369.2 |

FOREIGN PATENT DOCUMENTS 3303577 8/1984 Fed. Rep. of Germany.

Primary Examiner—Edward K. Look
Assistant Examiner—Todd Mattingly
Attorney, Agent, or Firm—Leo H. McCormick, Jr.; Larry J. Palguta; Ken C. Decker

[57] ABSTRACT

The invention relates to a vacuum brake-booster of the tandem type comprising two compartments (22, 24) separated by a stationary plate (20), each of the compartments being divided into a front chamber and a rear chamber by way of a piston (26, 28) and of an isolating diaphragm, at least the inner edge of which is equipped with a bead (38), each of the pistons (26, 28) being fixed to a movable hub (42) containing a valve mechanism, the piston (26) of the front compartment being so fixed by way of a cylindrical sleeve (30). According to the invention, the hub (42) possesses, on its periphery, a groove (32) into which penetrate respectively the inner end (34) of the piston (28) of the rear compartment (24) and the rear end (26) of the cylindrical sleeve (30), the bead (38) of the inner edge of the diaphragm (40) of the rear compartment (24) ensuring the locking of the assembly as a whole.

2 Claims, 2 Drawing Sheets

VACUUM BRAKE-BOOSTER OF THE TANDEM TYPE

BACKGROUND OF THE INVENTION

The present invention relates to vacuum brake-boosters of the tandem type, used especially for assisting the braking of motor vehicles.

Such brake-boosters have been known for a long time, and documents DE-A-3,505,626, FR-A-2,431,623 and U.S. Pat. No. 4,516,474, to mention only a few, describe various models of these.

These tandem brake-boosters are of relatively complicated construction, which results in high production costs. In particular, the two movable pistons which are separated by a stationary plate both have to be fixed to a movable hub.

SUMMARY DESCRIPTION OF THE INVENTION

An object of the present invention is to improve this means for fixing the pistons to the hub.

The invention therefore relates to a vacuum brake-booster of the tandem type, comprising two compartments separated by a stationary plate, each of these compartments being divided into a front chamber and a rear chamber by means of a piston and of an isolating diaphragm, at least the inner edge of which is equipped with a bead, each of the pistons being fixed to a movable hub containing a valve means, the piston of the front compartment being so fixed by way of a cylindrical sleeve.

According to the invention, the hub possesses, on its periphery, a groove into which penetrate respectively the inner end of the piston of the rear compartment and the rear end of the cylindrical sleeve, the bead of the inner edge of the diaphragm of the rear compartment ensuring the locking of the assembly as a whole.

BRIEF DESCRIPTION OF THE DRAWINGS

The invention will now be described by way of example with reference to the accompanying drawing in which.

DETAILED DESCRIPTION OF THE INVENTION

Figure 1:
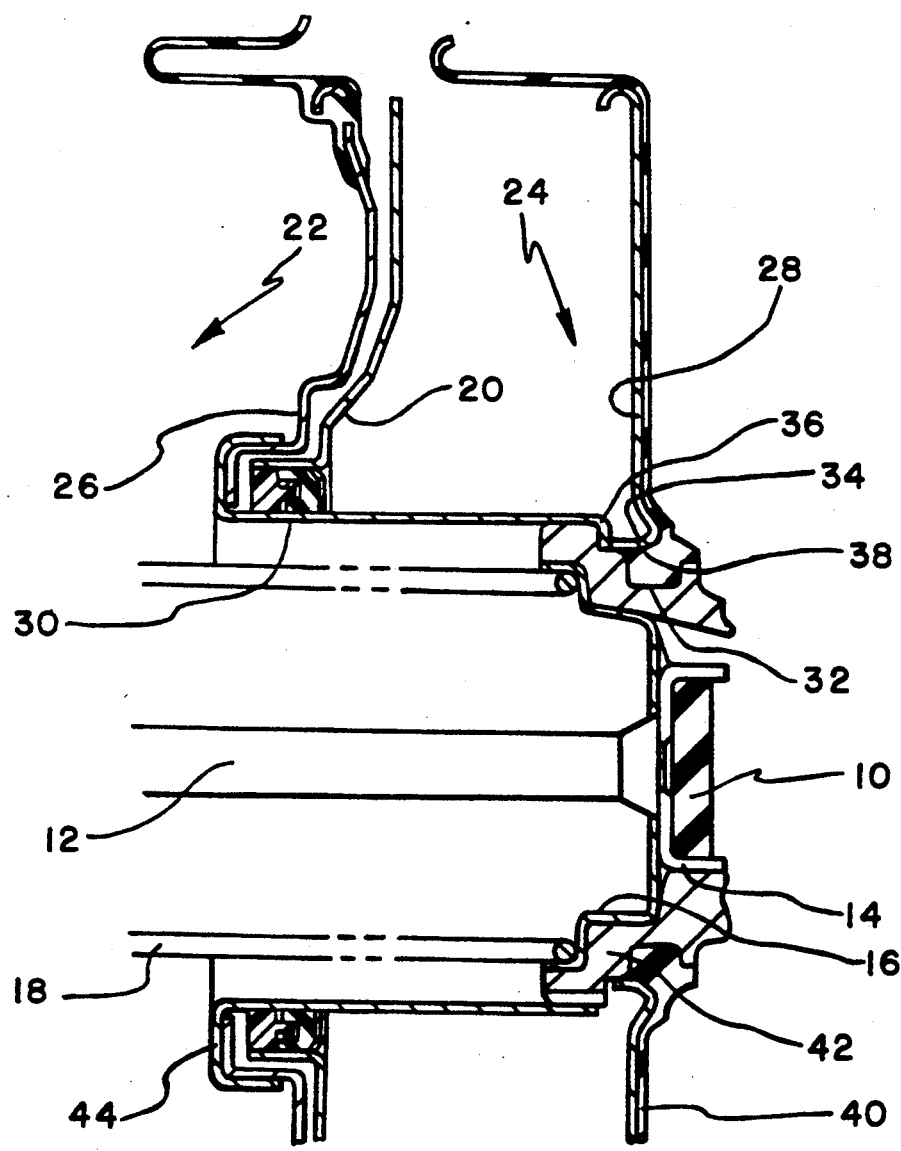
FIG. 1 shows diagrammatically, in section, a means for fixing the pistons to the hub of a brake-booster according to the invention.

Referring now to this single Figure, only the essential part of the invention has been illustrated, on the understanding that vacuum brake-boosters of the tandem type are well known.

A person skilled in the art will recognize the reaction disc 10, on which bears the push rod 12 acting, for example, on the piston of a master cylinder. The push rod 12 and its cup 14 are held against the reaction disc 10 by means of an elastic piece 16, and a helical spring 18 returns the hub 42 and the pistons to rest.

A stationary plate 20 separates the brake-booster into a front compartment 22 and a rear compartment 24. Each of these compartments is divided by a piston 26, 28 respectively.

The front piston 26 is fixed to a cylindrical sleeve 30. The front piston 26 engages, for example, into a gutter 44 provided for this purpose at the front end of the sleeve 30.

A groove 32 is made on the periphery of the hub 42 for receiving the inner end 34 of the piston of the rear compartment, the rear end 36 of the cylindrical sleeve 30 and a bead 38 formed on the inner edge of the diaphragm 40 of the rear compartment 24.

The rear end 36 of the cylindrical sleeve 30 has at least partially a radial turned-down portion, on which bears the inner end 34 of the piston 28 of the rear compartment 24, this end 34 preferably being curved in order to generate a substantially axial force blocking the sleeve 30 by means of the bead 38. It will easily be understood that the assembly of such a brake-booster becomes easier as a result of the absence of additional fastening parts, a simple engaging operation being sufficient to lock the parts to one another.

Of course, a person skilled in the art can make many modifications, without departing from the scope of the invention, as defined by the accompanying claims.

Figure 2:
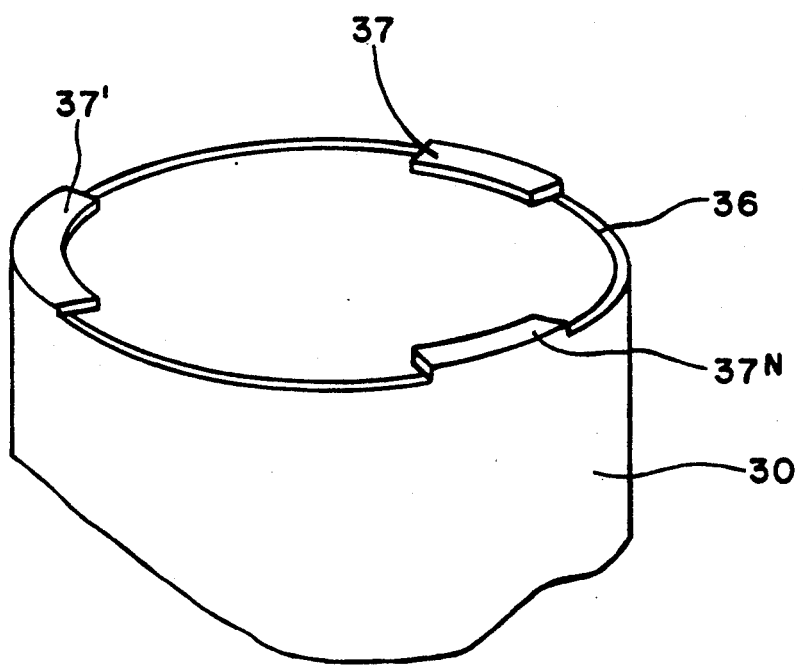
FIG. 2 is a perspective view of the sleeve of FIG. 1.

In particular, he can provide at the end of the cylindrical sleeve 30 a plurality of turned-down portions 37, 37'. . . 37$^n$, as shown in FIG. 2 judiciously distributed about the latter. He can also use another type of isolating joint between the stationary plate 20 and the sleeve 30 than that illustrated. He can also arrange the return spring 18 in a different way from that shown.

What we claim is:

1. In a tandem vacuum brake booster having front and rear compartments separated by a stationary plate, each of said compartments being divided into a front chamber and a rear chamber by a piston and an isolating diaphragm, said isolating diaphragm for said rear compartment having an inner edge with a bead, each of said pistons being fixed to a movable hub, said piston in said front compartment being connected to said movable hub by a cylindrical sleeve, said movable hub having a peripheral surface with a groove therein, said piston in said rear compartment having an inner end which is located in said groove, said cylindrical sleeve having a rear end with a turned down portion which is located in said groove, said turned down portion being substantially radial and said inner end of said piston in the rear compartment being curved to generate a substantially axial force for blocking said cylindrical sleeve by said bead, said bead on said isolating diaphragm in said rear compartment engaging said inner end of said piston in said rear compartment to lock said rear end of said cylindrical sleeve and movable hub together.

2. In the tandem vacuum brake booster as recited in claim 1, wherein said turned down portion is a plurality of portions regularly located about said inner end.